United States Patent
Haraguchi

(10) Patent No.: US 9,838,611 B2
(45) Date of Patent: Dec. 5, 2017

(54) IMAGE CAPTURING APPARATUS FOR OBTAINING NORMAL IMAGE AND RANGE IMAGE AND CONTROL METHOD THEREOF

(71) Applicant: CANON KABUSHIKI KAISHA, Tokyo (JP)

(72) Inventor: Kazuki Haraguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 14/678,246

(22) Filed: Apr. 3, 2015

(65) Prior Publication Data
US 2015/0285618 A1 Oct. 8, 2015

(30) Foreign Application Priority Data
Apr. 7, 2014 (JP) ................................. 2014-078977

(51) Int. Cl.
*H04N 5/235* (2006.01)
*G01C 3/08* (2006.01)
*H04N 5/353* (2011.01)

(52) U.S. Cl.
CPC ............. *H04N 5/2354* (2013.01); *G01C 3/08* (2013.01); *H04N 5/353* (2013.01)

(58) Field of Classification Search
CPC ......... H04N 5/2354; H04N 5/353; G01C 3/08
See application file for complete search history.

(56) References Cited

U.S. PATENT DOCUMENTS

| | | | | |
|---|---|---|---|---|
| 7,202,898 B1 * | 4/2007 | Braun | ..................... | G01C 3/08 250/559.08 |
| 2001/0024271 A1 * | 9/2001 | Takayanagi | .............. | G01C 3/08 356/5.01 |
| 2003/0052252 A1 * | 3/2003 | Sugiyama | .............. | H04N 5/335 250/208.1 |
| 2009/0114919 A1 * | 5/2009 | Kawahito | ................ | G01C 3/02 257/59 |
| 2009/0284731 A1 * | 11/2009 | Jin | ......................... | G01B 11/22 356/4.01 |

(Continued)

FOREIGN PATENT DOCUMENTS

JP 2004-294420 A 10/2004
JP 2010-213231 A 9/2010

*Primary Examiner* — Jay Patel
*Assistant Examiner* — Marnie Matt
(74) *Attorney, Agent, or Firm* — Cowan, Liebowitz & Latman, P.C.

(57) ABSTRACT

An image capturing apparatus includes a light emitting unit and an image sensor having a plurality of pixels are disposed in a matrix. Each pixel includes a photodiode, a pixel memory connected to the photodiode, and a floating diffusion portion connected to the pixel memory via a switch. The image capturing apparatus opens the switch from the start of a charge accumulation period that includes a light emission period of the light emitting unit until a predetermined time in the light emission period, reads out a first signal corresponding to the charge accumulated in the floating diffusion portion after the switch has been closed, reads out a second signal corresponding to a charge accumulated in the pixel memory when the charge accumulation period has passed and calculates a distance to the subject based on the first and second signals.

8 Claims, 13 Drawing Sheets

(56) References Cited

U.S. PATENT DOCUMENTS

| | | | |
|---|---|---|---|
| 2010/0079644 A1* | 4/2010 | Tamura | H04N 5/3532 348/302 |
| 2010/0182469 A1* | 7/2010 | Takamiya | H01L 27/14654 348/294 |
| 2010/0231774 A1* | 9/2010 | Tashiro | G01S 17/10 348/311 |
| 2011/0069299 A1* | 3/2011 | Hsu | G01C 3/085 356/4.02 |
| 2011/0128424 A1* | 6/2011 | Yamashita | H04N 5/353 348/296 |
| 2011/0234836 A1* | 9/2011 | Machida | H01L 27/14603 348/222.1 |
| 2011/0298079 A1* | 12/2011 | Kawahito | H01L 27/14603 257/443 |
| 2012/0312964 A1* | 12/2012 | Yamashita | H04N 5/37457 250/208.1 |
| 2013/0162973 A1* | 6/2013 | Kamiyama | G01C 3/08 356/5.01 |
| 2014/0078381 A1* | 3/2014 | Ovsiannikov | H04N 5/2354 348/370 |
| 2015/0060965 A1* | 3/2015 | Gidon | H01L 27/14627 257/292 |

* cited by examiner

IMAGE CAPTURING APPARATUS FOR OBTAINING NORMAL IMAGE AND RANGE IMAGE AND CONTROL METHOD THEREOF

BACKGROUND OF THE INVENTION

Field of the Invention

The present invention relates to image capturing apparatuses and control methods thereof.

Description of the Related Art

Image sensors provided with various functions aside from simply capturing images are being proposed in recent years.

A function for obtaining a range image using the TOF (Time of Flight) method is garnering attention as one such additional function for an image sensor. TOF is a method for measuring the distance to a subject by measuring the amount of time from when a pulse of light is emitted from a light source toward a subject to when the light reflected by the subject reaches an observation point (a delay time of the pulse of light). The speed of light is known to be $3 \times 10^8$ m/sec, and thus when, for example, the observation point and the light source are located at the same point, a delay time of 2 nsec means that the total traveling distance of the light is 60 cm and the distance to the subject is half thereof, namely 30 cm.

A technique that applies this principle to image sensors and obtains a range image by obtaining information of a distance to a subject on a pixel-by-pixel basis has been proposed. In Japanese Patent Laid-Open No. 2004-294420, each pixel is equipped with at least two transfer switches and two charge accumulation portions corresponding thereto, and a charge produced by a reflected light pulse is divided among the respective charge accumulation portions by the two transfer switches. Distance information is then obtained on a pixel-by-pixel basis by finding a ratio of charge amounts between the two charge accumulation portions. Meanwhile, Japanese Patent Laid-Open No. 2010-213231 proposes a technique in which by dividing respective charges among two pixel groups such as even-numbered rows and odd-numbered rows rather than on a pixel-by-pixel basis, distance information can be obtained by a configuration in which a single transfer switch and a single charge accumulation portion are provided for each pixel.

However, in Japanese Patent Laid-Open No. 2004-294420, the charge is divided by driving two transfer switches independently, and it is therefore necessary to precisely match the timings at which the two switches are driven. If there is variation between the transfer switches, transfer pulses, or the like, problems may occur in the charge dividing operations, resulting in errors in the distance information. In addition to this problem, Japanese Patent Laid-Open No. 2010-213231 divides the charges among a plurality of pixels as opposed to within a single pixel, which results in a drop in resolution.

SUMMARY OF THE INVENTION

The present invention has been made in consideration of the above situation, and, by using an image sensor capable of generating both a normal image and a range image, is to obtain distance information precisely from the range image without a drop in resolution.

According to the present invention, provided is an image capturing apparatus comprising: a light emitting unit configured to emit light toward a subject; an image sensor in which a plurality of pixels are disposed in a matrix, each pixel including a photoelectric conversion element that generates a charge in accordance with an amount of incident light, a first charge accumulation portion connected to the photoelectric conversion element, and a second charge accumulation portion connected to the first charge accumulation portion via a switch; a driving unit configured to drive the image sensor to open the switch from the start of a charge accumulation period that includes a light emission period of the light emitting unit until a predetermined time in the light emission period, read out a first signal corresponding to the charge accumulated in the second charge accumulation portion after the switch has been closed, and read out a second signal corresponding to a charge accumulated in the first charge accumulation portion when the charge accumulation period has passed; and a calculation unit configured to calculate a distance to the subject based on the first signal and the second signal.

According to the present invention, provided is a control method for an image capturing apparatus including a light emitting unit configured to emit light toward a subject and an image sensor in which a plurality of pixels are disposed in a matrix, each pixel including a photoelectric conversion element that generates a charge in accordance with an amount of incident light, a first charge accumulation portion connected to the photoelectric conversion element, and a second charge accumulation portion connected to the first charge accumulation portion via a switch, the method comprising: opening the switch from the start of a charge accumulation period that includes a light emission period of the light emitting unit until a predetermined time in the light emission period; reading out a first signal corresponding to the charge accumulated in the second charge accumulation portion after the switch has been closed; reading out a second signal corresponding to a charge accumulated in the first charge accumulation portion when the charge accumulation period has passed; and calculating a distance to the subject based on the first signal and the second signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Configuration of Image Capturing Apparatus

Figure 1:
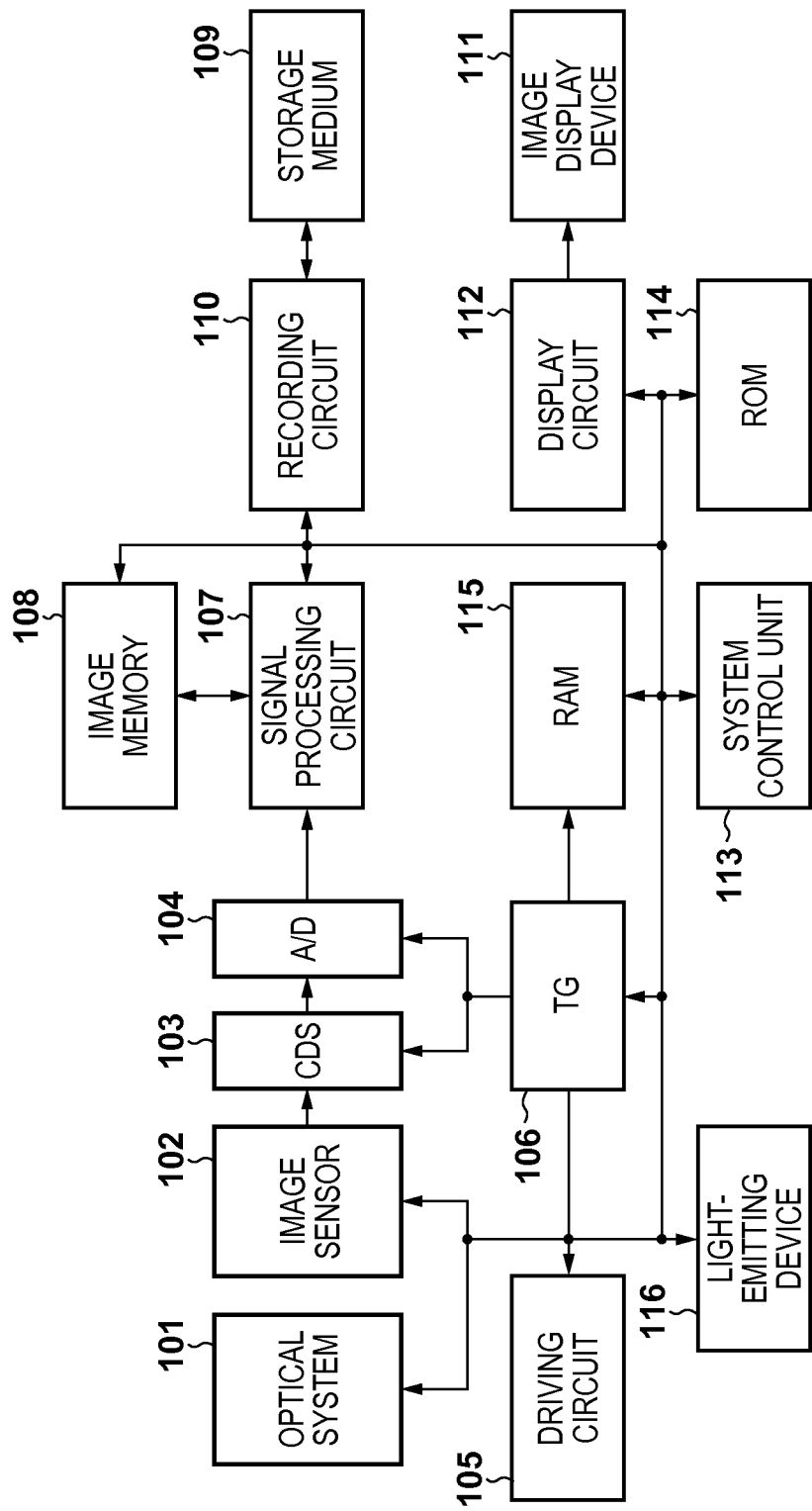
FIG. 1 is a block diagram illustrating the configuration of an image capturing apparatus according to embodiments of the present invention.

FIG. 1 is a block diagram schematically illustrating the configuration of an image capturing apparatus according to embodiments of the present invention. In the image capturing apparatus illustrated in FIG. 1, an optical system 101 is comprised of a lens, an aperture, and the like, and may be configured integrally or detachably with the image capturing apparatus. An image sensor 102 photoelectrically converts light incident via the optical system 101 and outputs an analog signal. A CDS circuit 103 processes the analog signal output from the image sensor 102, and an A/D converter 104 converts image data expressed by the analog signal into a digital signal. A timing signal generation circuit (TG) 106 generates signals for driving the CDS circuit 103, the A/D converter 104, a driving circuit 105, and a light-emitting device 116, and the driving circuit 105 drives the optical system 101, the image sensor 102, and the light-emitting device 116.

Image data output from the A/D converter 104 is temporarily stored in an image memory 108, and undergoes various types of signal processes such as white balance correction and gamma correction carried out by a signal processing circuit 107. The processed image data is saved in a storage medium 109 via a recording circuit 110. An image display device 111 displays the signal-processed image data via a display circuit 112.

A system control unit 113 is configured of a CPU and the like that control the image capturing apparatus as a whole. A ROM 114 stores programs denoting control methods executed by the system control unit 113, control data such as parameters, tables, and the like used when executing the programs, and so on. A RAM 115 transfers and stores the programs, control data, and correction data stored in the ROM 114, and is used when the system control unit 113 controls the image capturing apparatus.

Figure 2:
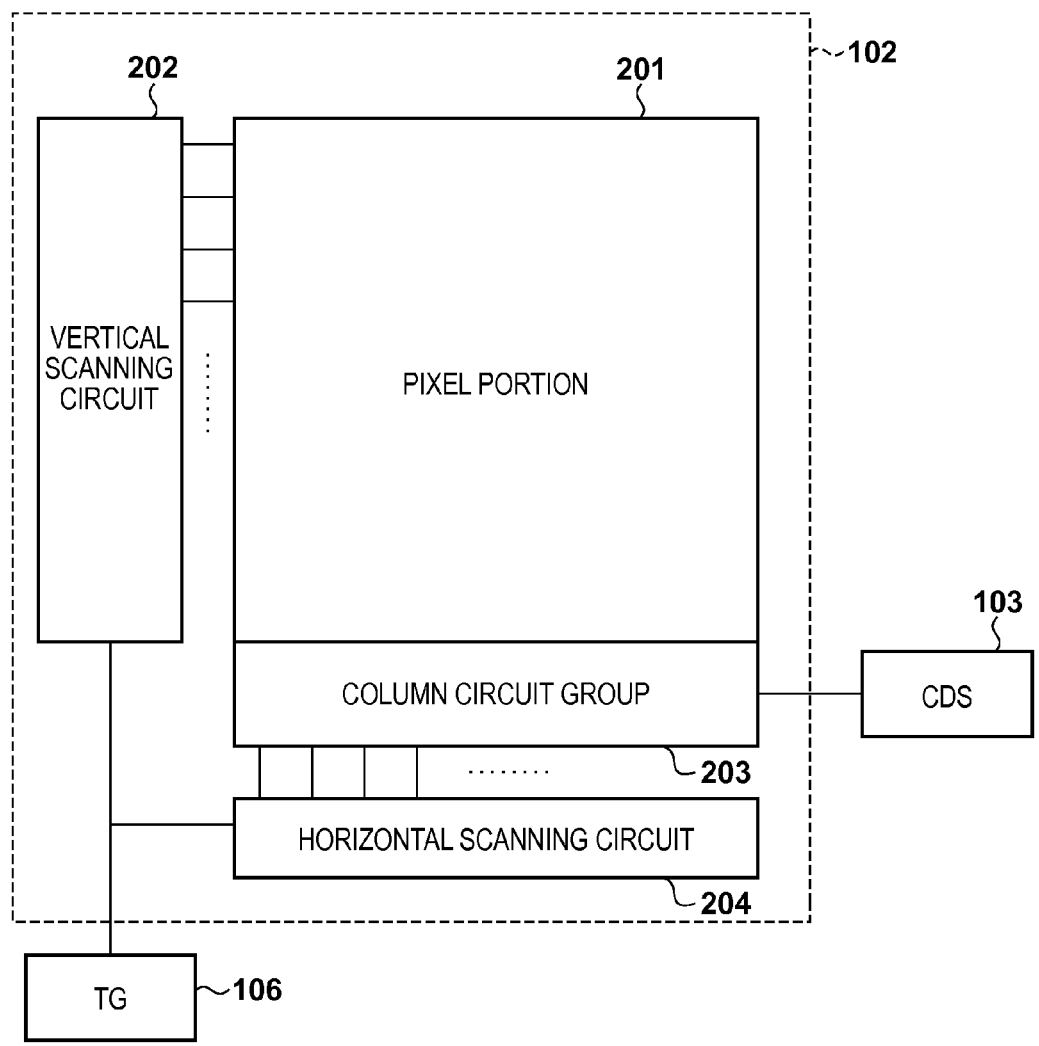
FIG. 2 is a diagram schematically illustrating a configuration of an image sensor according to embodiments.

FIG. 2 is a diagram schematically illustrating the configuration of the image sensor 102 illustrated in FIG. 1. As illustrated in FIG. 2, the image sensor 102 includes a pixel portion 201, a vertical scanning circuit 202, a column circuit group 203, and a horizontal scanning circuit 204. The pixel portion 201 has a plurality of pixels arranged in a matrix, and receives an optical image formed by the optical system 101. The vertical scanning circuit 202 selects rows in the pixel portion 201 in order, and the horizontal scanning circuit 204 selects columns in the pixel portion 201 in order, and as a result, a plurality of pixels in the pixel portion 201 are selected in order. The column circuit group 203 reads out signals of the rows selected by the vertical scanning circuit 202, and outputs signals of the columns selected by the horizontal scanning circuit 204 to the CDS circuit 103.

First Embodiment

Next, a configuration and control of the image capturing apparatus configured as described above, according to a first embodiment, will be described in detail.

Configuration of Pixel and Column Circuit

Figure 3:
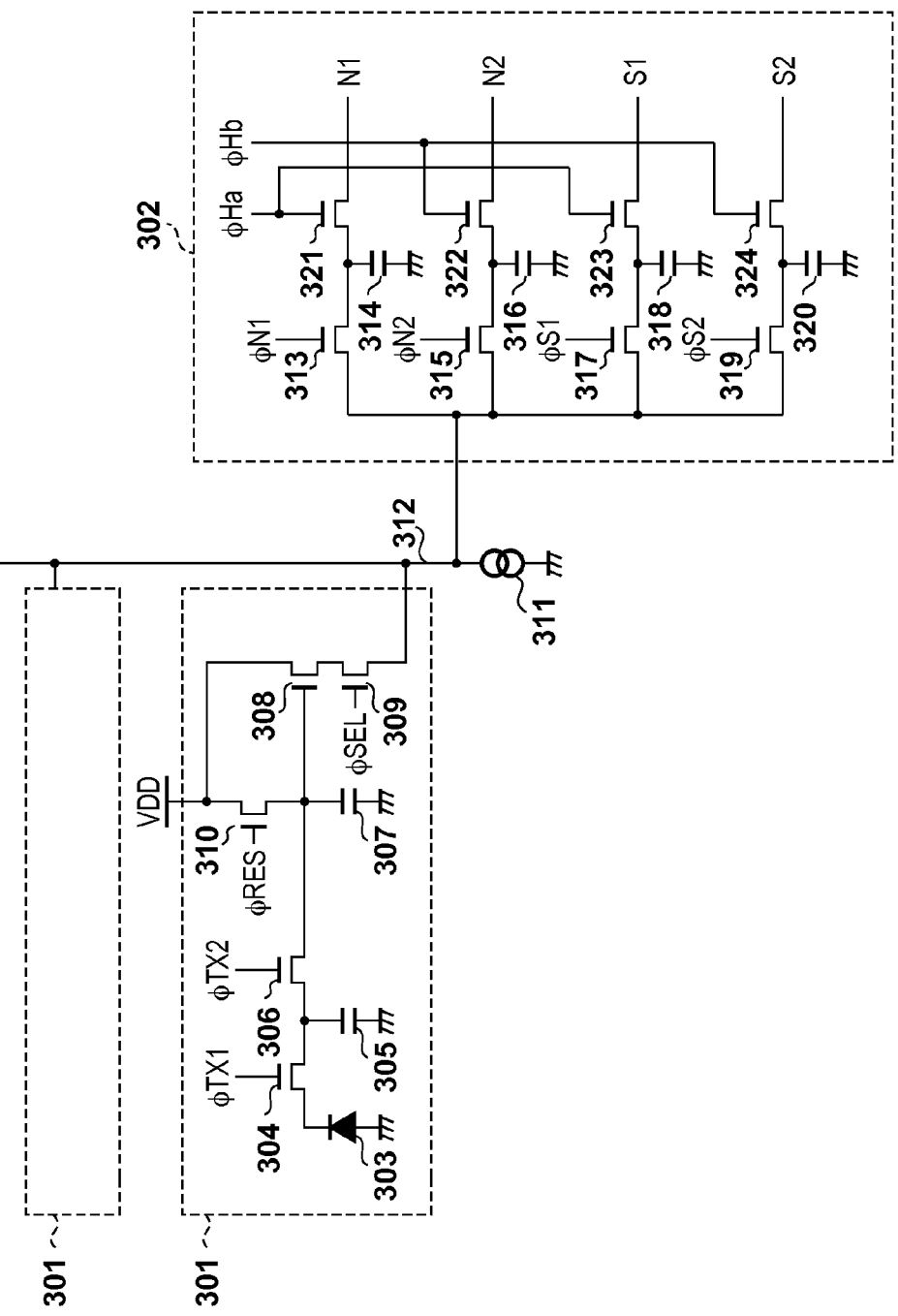
FIG. 3 is an equivalent circuit diagram illustrating a single pixel and a column circuit according to a first embodiment.

FIG. 3 is an equivalent circuit diagram illustrating a single pixel 301 that partially configures the image sensor 102 and a single column circuit 302 that partially configures the column circuit group 203 according to the first embodiment. The pixel portion 201 is formed by a plurality of the pixels 301 being arranged in a matrix. The column circuit 302 is a circuit that samples the pixel signals from a corresponding column; the column circuit 302 is configured on a column-by-column basis, and the column circuits 302 configure the column circuit group 203.

In the pixel 301, a photodiode (PD) 303 functions as a photoelectric conversion portion that receives incident light and generates and accumulates a signal charge based on the amount of received light. A first transfer switch 304 is driven by a first transfer pulse φTX1, and transfers the charge generated by the PD 303 to a pixel memory 305. The pixel memory 305 is configured to be capable of holding the charge transferred from the PD 303. A second transfer switch 306 is driven by a second transfer pulse φTX2, and transfers the charge held in the pixel memory 305 to a floating diffusion portion (FD) 307. The FD 307 is configured to be capable of holding the charge transferred from the pixel memory 305. Note that it is assumed here that the pixel memory 305 and the FD 307 are formed having the same impurity concentration in order to simplify a process for forming the pixel portion 201. A reset switch 310 is driven by a reset pulse φRES, and is configured to be capable of supplying a reference potential VDD.

The FD 307 holds the charge transferred as described above, and also functions as a charge-voltage conversion portion that converts the held charge into a voltage signal. An output portion 308 amplifies the voltage signal based on the charge held in the FD 307 and outputs the resultant as a pixel signal. A source follower circuit using an MOS transistor of the output portion 308 and a constant current source 311 is illustrated as an example here. A selection switch 309 is driven by a vertical selection pulse φSEL, and the signal amplified by the output portion 308 is output to a vertical signal line 312. The signal output to the vertical signal line 312 is sampled by the column circuit 302 configured corresponding to that column, and is output to the CDS circuit 103 illustrated in FIG. 1.

The column circuit 302 includes readout switches 313, 315, 317, and 319, signal holding portions 314, 316, 318, and 320, and horizontal transfer switches 321, 322, 323, and 324. The readout switches 313, 315, 317, and 319 are driven by readout pulses φN1, φN2, φS1, and φS2, respectively, and the respective signals output to the vertical signal line 312 are sampled by the signal holding portions 314, 316, 318, and 320.

The horizontal transfer switches 321 and 323 are driven by a horizontal selection pulse φHa, and the horizontal transfer switches 322 and 324 are driven by a horizontal selection pulse φHb. The signals sampled by the signal holding portions 314, 316, 318, and 320 are output in sequence to the CDS circuit 103 on column-by-column bases as an N1 signal, an N2 signal, an S1 signal, and an S2 signal, respectively, in response to the horizontal selection pulses φHa and φHb. Note that in addition to the foregoing configurations, the column circuit 302 may also be equipped as appropriate with a buffer amp for amplifying the signals.

Configuration and Driving Method of Light-Emitting Device

Figure 4:
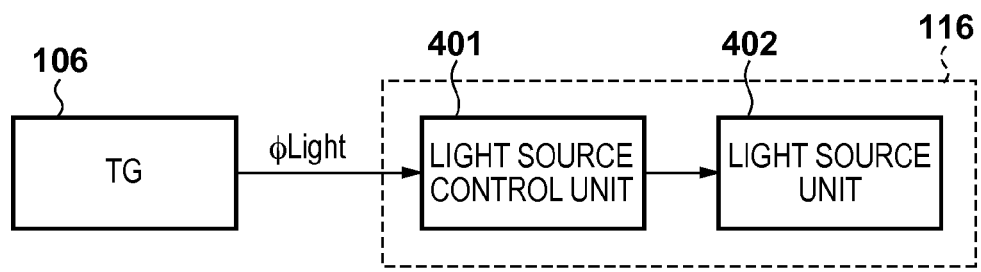
FIG. 4 is a block diagram illustrating the configuration of a light-emitting device according to the first embodiment.

FIG. 4 is a block diagram illustrating the configuration of the light-emitting device 116 illustrated in FIG. 1, according to the first embodiment. The light-emitting device 116 is primarily configured of a light source control unit 401 and a light source unit 402. The light source control unit 401 receives a light emission pulse φLight from the TG 106 and controls on/off of the light source unit 402 in accordance with φLight, turning on when φLight is Hi and turning off when φLight is Low.

Driving Pattern when Obtaining Normal Image

Next, a driving pattern of the image sensor 102 when obtaining a normal image according to the first embodiment will be described with reference to the timing chart illustrated in FIG. 5. n, n+1, and n+2 in parentheses after each pulse name indicate that the pulses are applied in the nth row, n+1th row, and n+2th row, respectively. Note that n is an even number.

First, in period t501, the reset pulse φRES for all rows and the second transfer pulse φTX2 for all rows are set to Hi. Meanwhile, the first transfer pulse φTX1 for all rows is set to Hi in period t503, which starts at the same time as period t501. As a result, the reset switch 310, the first transfer switch 304, and the second transfer switch 306 are turned on (opened), and the potentials of the PD 303, the pixel memory 305, and the FD 307 are reset to an initial potential.

When the reset of the PD 303 and the pixel memory 305 in period t501 ends, charge accumulation is carried out in period t502. At this time, the charge generated by the PD 303 is held in the pixel memory 305 via the first transfer switch 304. When period t502 (t503) ends, the first transfer pulse φTX1 is set to Low for all rows and exposure ends. Accumulation is carried out simultaneously for all pixels in period t502, and thus this driving is what is known as global electronic shutter driving.

Next, in period t504, the reset switch 310 is turned on and the FD 307 is reset by setting the reset pulse φRES (n) to Hi. Thereafter, during period t505, a readout row is selected by setting the vertical selection pulse φSEL (n) in the nth row to Hi and turning on the selection switch 309. In period t506, the reset potential in the FD 307 is read out to the signal holding portion 314 by setting the readout pulse N1 to Hi and turning the readout switch 313 on.

In period t507, the charge accumulated in the pixel memory 305 is read out to the FD 307 by setting the second transfer pulse φTX2 (n) to Hi and turning the second transfer switch 306 on. In period t508, the signal potential in the FD 307 is read out to the signal holding portion 318 by setting the readout pulse φS1 to Hi and turning the readout switch 317 on.

In period t509, the horizontal transfer switches 321 and 323 are driven based on the horizontal selection pulse φHa, and the signal of the nth row sampled in the signal holding portions 314 and 318 is read out for each column. Meanwhile, when the horizontal transfer of the nth row begins in period t509, the readout of the signal in the n+1th row begins simultaneously, in the same manner as with the nth row. However, unlike the nth row, the signal in the n+1th row is read out via the readout switch 315, the signal holding portion 316, and the horizontal transfer switch 322, as well as the readout switch 319, the signal holding portion 320, and the horizontal transfer switch 324. In this manner, by alternating the readout paths in the column circuit between even-numbered rows and odd-numbered rows, the signal readout can be started without waiting for the horizontal transfer in the previous row to finish, which makes it possible to reduce the readout time.

Next, when the readout of the n+1th row finishes, the signal in the n+2th row is read out through the same readout path in the column circuit as with the nth row, which is an even-numbered row; thereafter, the image data can be obtained by carrying out the same process on all of the rows.

Figure 5:
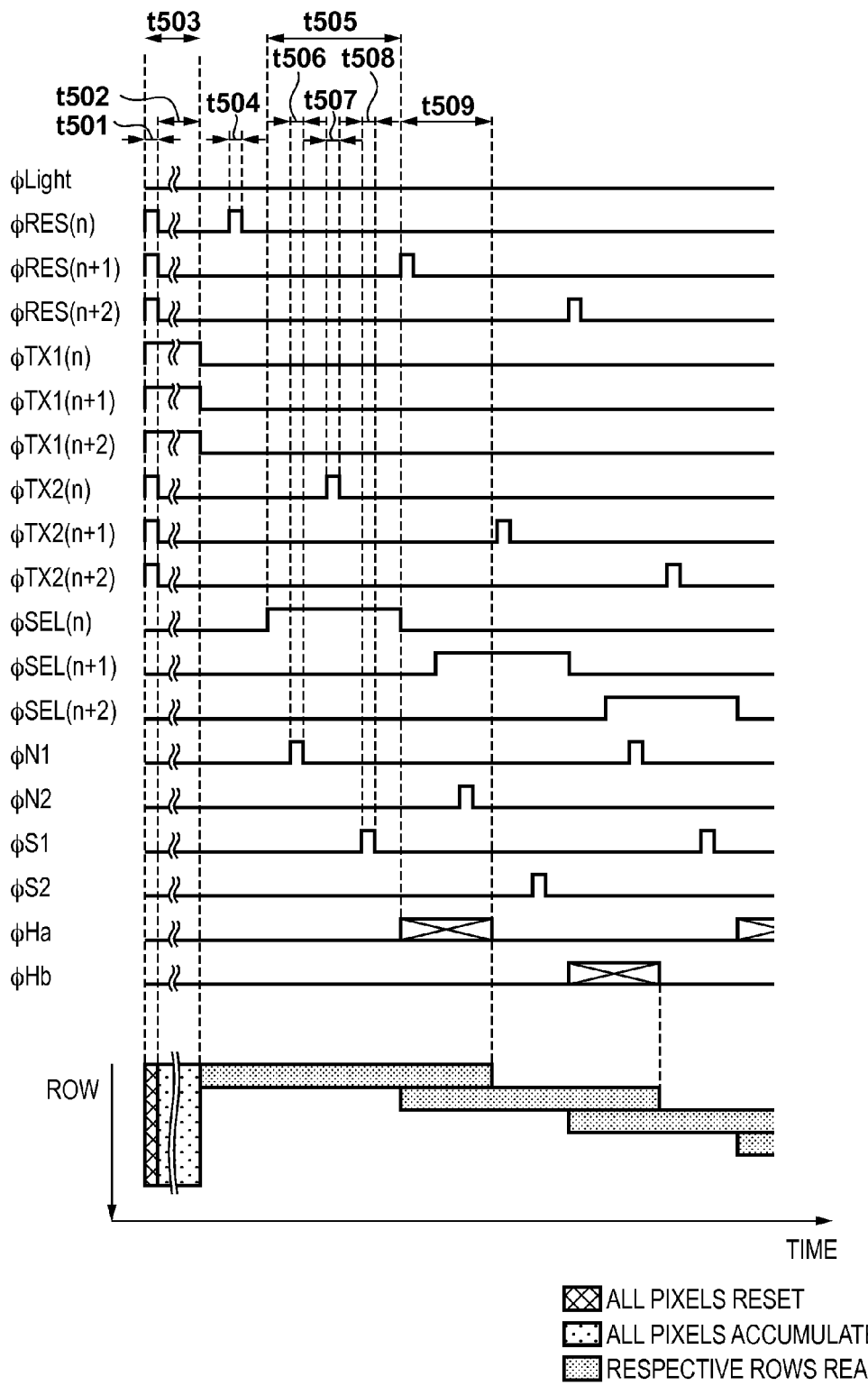
FIG. 5 is a timing chart illustrating a driving pattern for an image sensor when obtaining a normal image according to the first embodiment.

Note that in the present embodiment, in the charge accumulation period in period t502 illustrated in FIG. 5, the charge generated by the PD 303 is sequentially transferred to the pixel memory 305 and accumulated by turning the first transfer switch 304 on. Furthermore, when the charge accumulation period has passed, the first transfer switch 304 is driven off (closed). However, the present invention is not limited thereto, and the driving may be carried out as follows, for example. That is, the charge is transferred to the pixel memory 305 by turning the first transfer switch 304 off in period t502, accumulating the charge in the PD 303, and turning the first transfer switch 304 on/off when the exposure finishes. Alternatively, rather than providing the first transfer switch 304, the charge accumulation period may be ended when the charge is accumulated in the pixel memory 305.

Driving Pattern when Obtaining Range Image

Next, a driving pattern of the image sensor 102 when obtaining a range image according to the first embodiment will be described with reference to the timing chart illustrated in FIG. 6. n, n+1, and n+2 in parentheses after each pulse name indicate that the pulses are applied in the nth row, n+1th row, and n+2th row, respectively, in the same manner as in FIG. 5. However, both the even-numbered rows and the odd-numbered rows are read out in the same manner when the range image is obtained.

First, during period t612, a readout row is selected by setting the vertical selection pulse φSEL (n) in the nth row to Hi and turning on the selection switch 309. In addition, the reset pulse φRES (n), the first transfer pulse φTX1 (n), and the second transfer pulse φTX2 (n) are set to Hi in period t601. As a result, the reset switch 310, the first transfer switch 304, and the second transfer switch 306 in the nth row are turned on, and the potentials of the PD 303, the pixel memory 305, and the FD 307 are reset to an initial potential. In period t602, the reset potential in the FD 307 is read out to the signal holding portion 314 by setting the readout pulse φN1 to Hi and turning the readout switch 313 on.

Driving carried out in periods t603, t604, and t605 will be described next. FIG. 7 illustrates an enlargement of periods t603, t604, and t605 for φLight, φTX1 (n), and φTX2 (n) shown in FIG. 6. A dot-dash line above φLight in period t605' indicates an example of reflected light from a subject.

The second transfer pulse φTX2 (n) is set to Hi in period t603 and the first transfer pulse φTX1 (n) is set to Hi in period t604, and the first transfer switch 304 and the second transfer switch 306 are turned on. As a result, the charge generated by the PD 303 is held in a combined capacitance configured of the pixel memory 305 and the FD 307.

When period t603 ends, the second transfer pulse φTX2 (n) is set to Low and the second transfer switch 306 is turned off, and the charge generated by the PD 303 is held in the pixel memory 305 in addition to the charge held in period t603.

The charge can be divided between the pixel memory 305 and the FD 307 by turning only the second transfer switch 306 off in this manner. Through this, charge division errors caused by control for carrying out the charge division operation independently between two transfer switches can be reduced.

Meanwhile, in the first embodiment, the starting time of periods t603 and t604 is set to be the same, and period t604 is set to be twice the length of period t603. Furthermore, the halfway point of period t605 in which the light source unit 402 is on (a light emission period) is set to match the timing at which period t603 ends. Here, the charge generated by the PD 303 in period t603 is represented by Q1, and the charge generated by the PD 303 from when period t603 ends to when period t604 ends is represented by Q2. In this case, the timing of emitted light and the timing of reflected light can be thought of as the same in the case where the subject is close, for example, and thus the charge Q1 and the charge Q2 have almost the same charge amount. On the other hand, in the case where the subject is far, the timing of the reflected light will be later than the timing of the emitted light (the timing indicated by the dot-dash line at t605', for example), and thus the charge Q2 will be greater than the charge Q1.

Next, returning to FIG. 6, period t606 and on will be described. In period t606, the portion of the signal potential in the FD 307 is read out to the signal holding portion 318 by setting the readout pulse φS1 to Hi and turning the readout switch 315 on.

In period t607, the reset pulse φRES (n) is set to Hi and the FD 307 is reset to the initial potential again. In period t608, the second reset potential in the FD 307 is read out to the signal holding portion 316 by setting the readout pulse φN2 to Hi and turning the readout switch 315 on.

In period t609, the charge in the pixel memory 305 is transferred to the FD 307 by setting the second transfer pulse φTX2 (n) to Hi and turning the second transfer switch 306 on. In period t610, the signal potential held in the FD 307 is read out to the signal holding portion 320 by setting the readout pulse φS2 to Hi and turning the readout switch 319 on.

In period t611, the horizontal transfer switches 321, 322, 323, and 324 are driven based on the horizontal selection pulses φHa and φHb, and the signals N1, N2, S1, and S2 in the nth row, sampled in the signal holding portions 314, 316, 318, and 320, respectively, are read out in sequence on a column-by-column basis.

When period t611 ends, the signals of the n+1th row are read out in the same manner as the nth row. The signals of the n+2th row are read out in the same manner when the readout of the n+1th row ends, and the same driving is carried out thereafter for all the rows.

Here, the driving method used when obtaining the range image is rolling driving in which reset/accumulation/readout are repeated sequentially on a row-by-row basis.

Calculation Method when Obtaining Range Image

The image sensor 102 is driven according to the driving pattern used when obtaining the range image as described above, and the read-out signals N1, N2, S1, and S2 are transferred to the signal processing circuit 107 via the CDS circuit 103 and the A/D converter 104.

Figure 6:
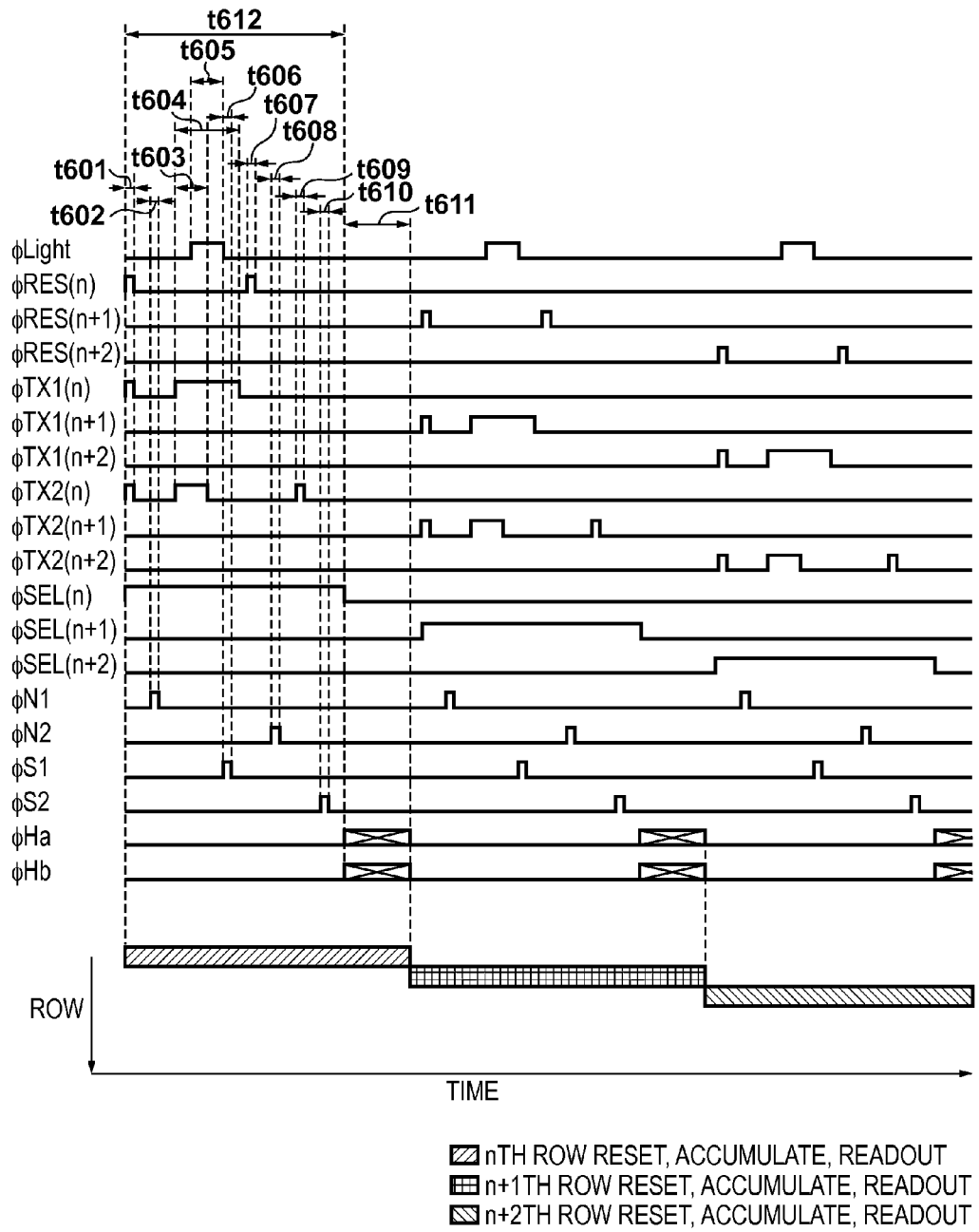
FIG. 6 is a timing chart illustrating a driving pattern for an image sensor when obtaining a range image according to the first embodiment.
Figure 7:
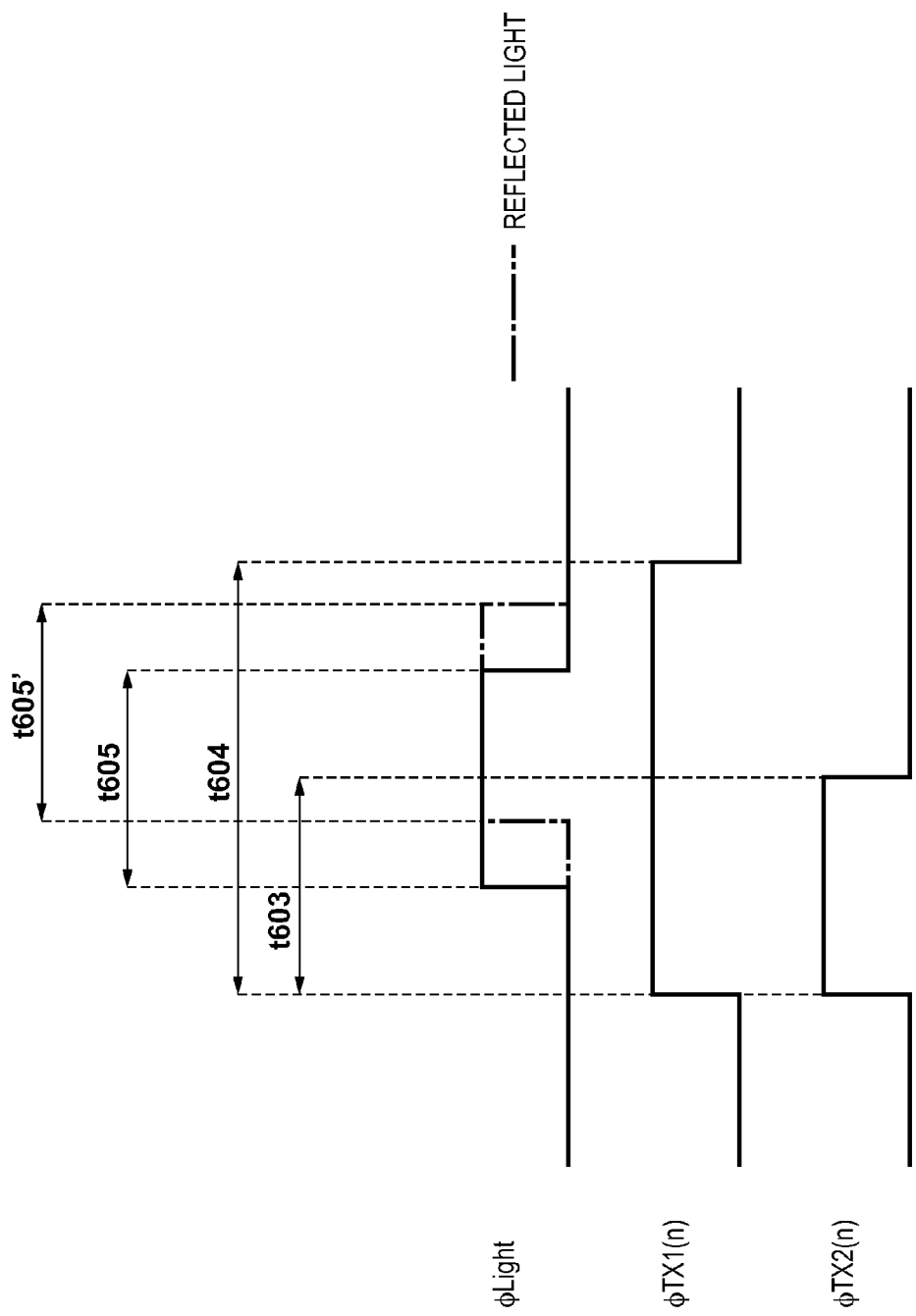
FIG. 7 is a diagram illustrating part of the timing chart of FIG. 6.

The capacity of the pixel memory 305 is represented by Cm, the capacity of the FD 307 is represented by Cf, the charge generated by the PD 303 in period t603 shown in FIG. 6 is represented by Q1, and the charge generated by the PD 303 from when period t603 ends to when period t604 ends is represented by Q2. In this case, the signal processing circuit 107 carries out a process for finding the charges Q1 and Q2 through the following Formulas (1) and (2), using the signals N1, N2, S1, and S2.

$$Q1 = (Cm+Cf)*(S1-N1) \quad (1)$$

$$Q2 = (Cm+Cf)*(S2-N2)-Cm*(S1-N1) \quad (2)$$

When a ratio of the charge Q2 to the sum of the charges Q1 and Q2 is represented by R, the following Formula (3) holds true.

$$R = Q2/(Q1+Q2) \quad (3)$$

Here, when a time at which φLight is Hi in period t603 is represented by u1 and a time at which φLight is Hi from when period t603 ends to when period t604 ends is represented by u2, a ratio U of u2 to the sum of u1 and u2 is expressed as:

$$U = u2/(u1+u2) \quad (4)$$

Next, in addition to the charge ratio R and the light emission time ratio U found through the aforementioned Formulas (3) and (4), a light travel time from when a pulse of light is emitted toward the subject to when the light is reflected back is represented by t [sec] and the speed of light is represented by c [m/sec]. Furthermore, when the light emission time of the light source unit 402 corresponding to period t605 in FIG. 6 is represented by W [sec] and the distance to the subject is represented by L [m], a relationship between the charge ratio R and the light travel time t and a relationship between the light travel time t and the distance L to the subject are as indicated below.

$$R = 1/W*t+U \quad (5)$$

$$t = 2L/c \quad (6)$$

The above Formula (5) expresses the relationship between the charge ratio R and the light travel time t; the charge ratio R is in inverse proportion to the light emission time W, and the light emission time ratio U serves as an offset. In the present embodiment, U is set to be ½, and thus a relationship between the charge ratio R and the distance L to the subject can be expressed through the following Formula (7), based on Formulas (5) and (6).

$$L = Wc/2*R-Wc/4 \quad (7)$$

In this manner, the distance information can be obtained on a pixel-by-pixel basis by the signal processing circuit 107 carrying out the calculations indicated in Formulas (1) to (7) using the signals N1, N2, S1, and S2 from the image sensor.

According to the present first embodiment as described thus far, in an image sensor having a conventional pixel configuration including a pixel memory, a charge can be divided by driving only a transfer switch provided between the pixel memory and an FD. As a result, errors in distance information caused by variations in transfer pulses, transfer switches, and so on can be reduced, and an image sensor that does not cause a drop in the resolution of the range image can be realized as well.

Although the foregoing describes all of the pixels that configure the pixel portion 201 as being the pixel 301 illustrated in FIG. 3, the present invention is not limited thereto, and the configuration may be such that only some of the pixels are configured as the pixel 301.

Second Embodiment

Next, a second embodiment of the present invention will be described. In the aforementioned first embodiment, the column circuit 302 is configured with the signal holding portions for the signals N1, N2, S1, and S2 disposed in parallel, with the aim of accelerating the range image readout. When obtaining the range image, arranging the four signal holding portions in parallel makes it possible to, after the respective signals is held in the signal holding portions, read out the signals in an amount of time equivalent to only the horizontal selection pulses H of the number of columns present. However, a column circuit in which the four signal holding portions are disposed in parallel has a greater circuit scale in the horizontal direction, resulting in disadvantages in terms of the layout, and a resulting possibility that the number of columns will be restricted or the like.

Accordingly, in the second embodiment, a column circuit is configured having the same function as the column circuit according to the first embodiment, but with a reduced circuit scale and with consideration given to the layout in the horizontal direction. Specifically, the number of horizontal transfer switches can be halved in a single column circuit by arranging, in parallel, two circuits in which two signal holding portions are connected in series. This also makes it possible to reduce the space occupied in the horizontal direction.

Configuration of Column Circuit

Figure 8:
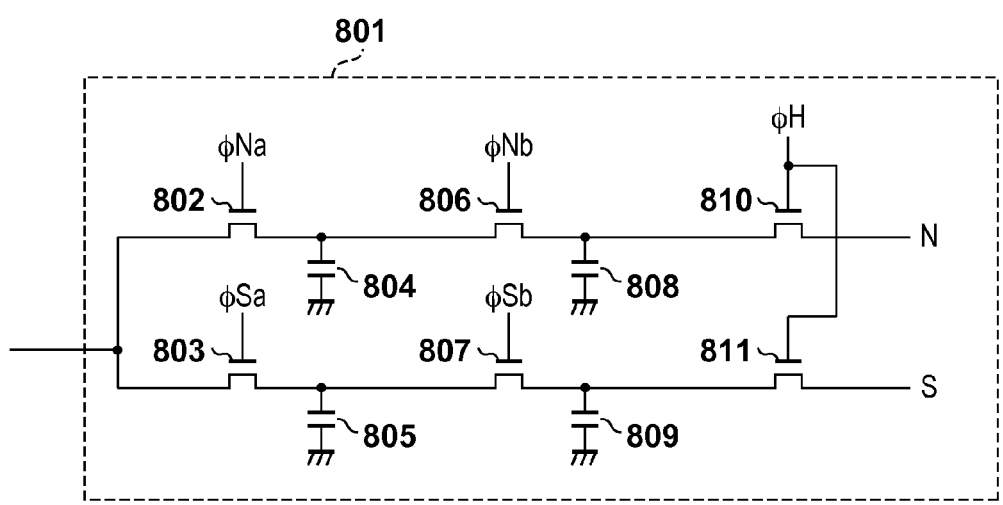
FIG. 8 is an equivalent circuit diagram illustrating a column circuit according to a second embodiment.

FIG. 8 is an equivalent circuit diagram illustrating a column circuit 801 according to the second embodiment, which can be used in place of the column circuit 302 described with reference to FIG. 3 in the first embodiment. Note that the configurations of the pixel 301, the vertical signal line 312, and so on are assumed to be the same as those illustrated in FIG. 3. The column circuit 801 is configured of first readout switches 802 and 803, first signal holding portions 804 and 805, second readout switches 806 and 807, second signal holding portions 808 and 809, and horizontal transfer switches 810 and 811.

The first readout switch 802 is driven by a first readout pulse φNa and the first readout switch 803 is driven by a first readout pulse φSa, and respective signals output to the vertical signal line 312 are held in the first signal holding portions 804 and 805. The second readout switch 806 is driven by a second readout pulse φNb and the second readout switch 807 is driven by a second readout pulse φSb, and respective signals held in the first signal holding portions 804 and 805 are transferred to the second signal holding portions 808 and 809.

The horizontal transfer switches 810 and 811 are driven by a horizontal selection pulse φH, and the signals held in the second signal holding portions 808 and 809 are output sequentially to the CDS circuit 103 on a column-by-column basis.

By disposing, in parallel, two circuit systems in which two signal holding portions are connected in series in this manner, the number of horizontal transfer switches can be halved, from four to two, as compared to the column circuit 302 described in the first embodiment, which makes it possible to reduce the space occupied in the horizontal direction and is therefore advantageous in terms of the layout.

Driving Pattern when Obtaining Normal Image

Figure 9:
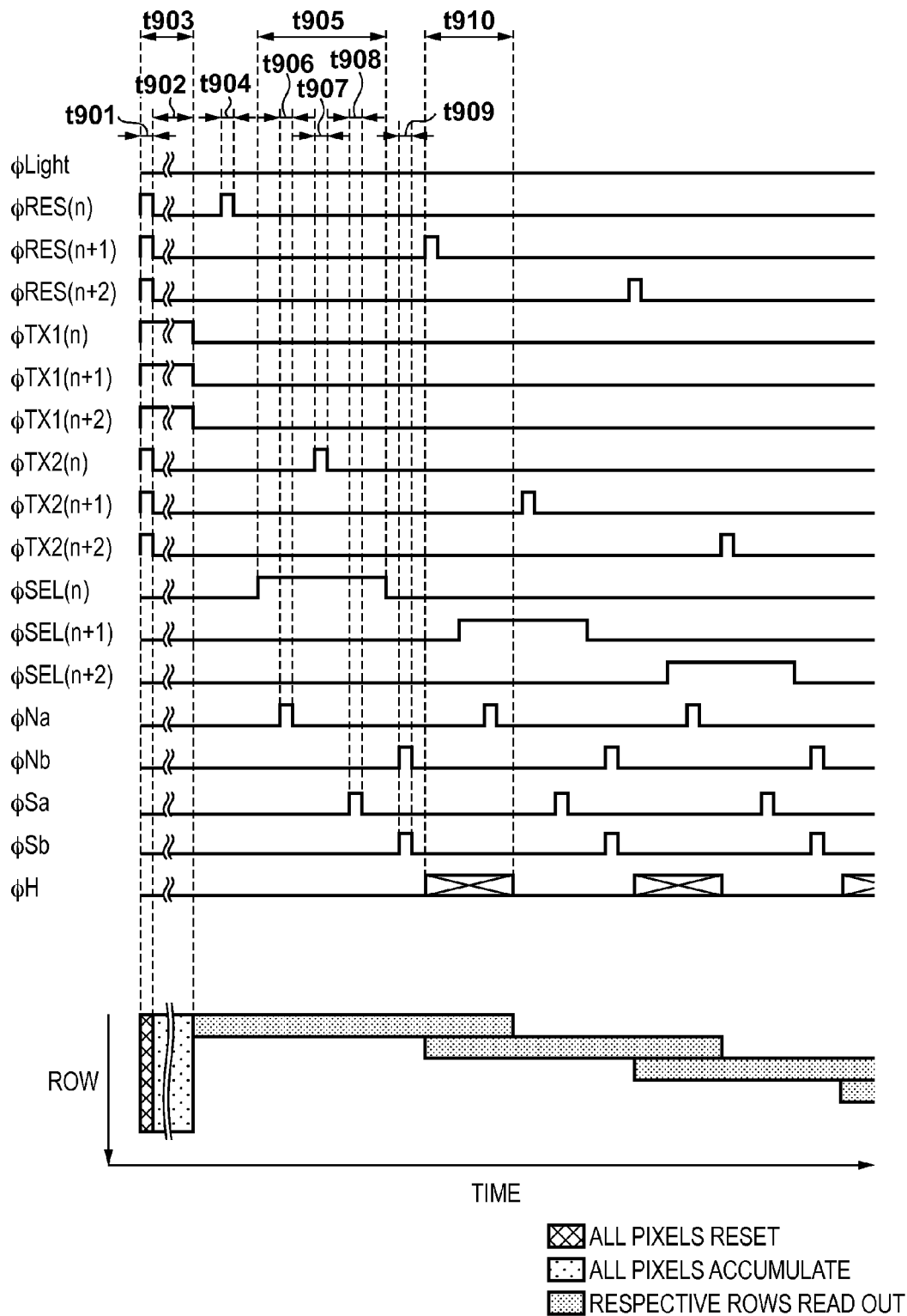
FIG. 9 is a timing chart illustrating a driving pattern for an image sensor when obtaining a normal image according to the second embodiment.

Next, a driving pattern of the image sensor 102 when obtaining a normal image according to the second embodiment will be described with reference to the timing chart illustrated in FIG. 9. n, n+1, and n+2 in parentheses after each pulse name indicate that the pulses are applied in the nth row, n+1th row, and n+2th row, respectively. However, unlike in the first embodiment, no distinction is made between even-numbered rows and odd-numbered rows.

Periods t901 to t904 are the same as periods t501 to t504 in the timing chart illustrated in FIG. 5 and described in the first embodiment.

Thereafter, during period t905, a readout row is selected by setting the vertical selection pulse SEL (n) in the nth row to Hi and turning on the selection switch 309. In period t906, the reset potential in the FD 307 is read out to the first signal holding portion 804 by setting the readout pulse φNa to Hi and turning the first readout switch 802 on.

In period t907, the charge accumulated in the pixel memory 305 is read out to the FD 307 by setting the second transfer pulse φTX2 (n) to Hi and turning the second transfer switch 306 on. In period t908, the signal potential in the FD 307 is read out to the first signal holding portion 805 by setting the first readout pulse φSa to Hi and turning the first readout switch 803 on.

In period t909, the signals held in the first signal holding portion 804 and 805 are transferred to the second signal holding portions 808 and 809 by setting the second readout pulses φNb and φSb to Hi and turning the second signal readout switches 806 and 807 on.

In period t910, the horizontal transfer switches 810 and 811 are driven based on the horizontal selection pulse φH, and the signals in the nth row held in the second signal holding portions 808 and 809 are read out in sequence on a column-by-column basis. The readout of the n+1th row starts in the same manner as the nth row at the starting time of period t910 and the same driving is carried out for all the rows, thereby the normal image can be obtained.

Driving Pattern when Obtaining Range Image

Figure 10:
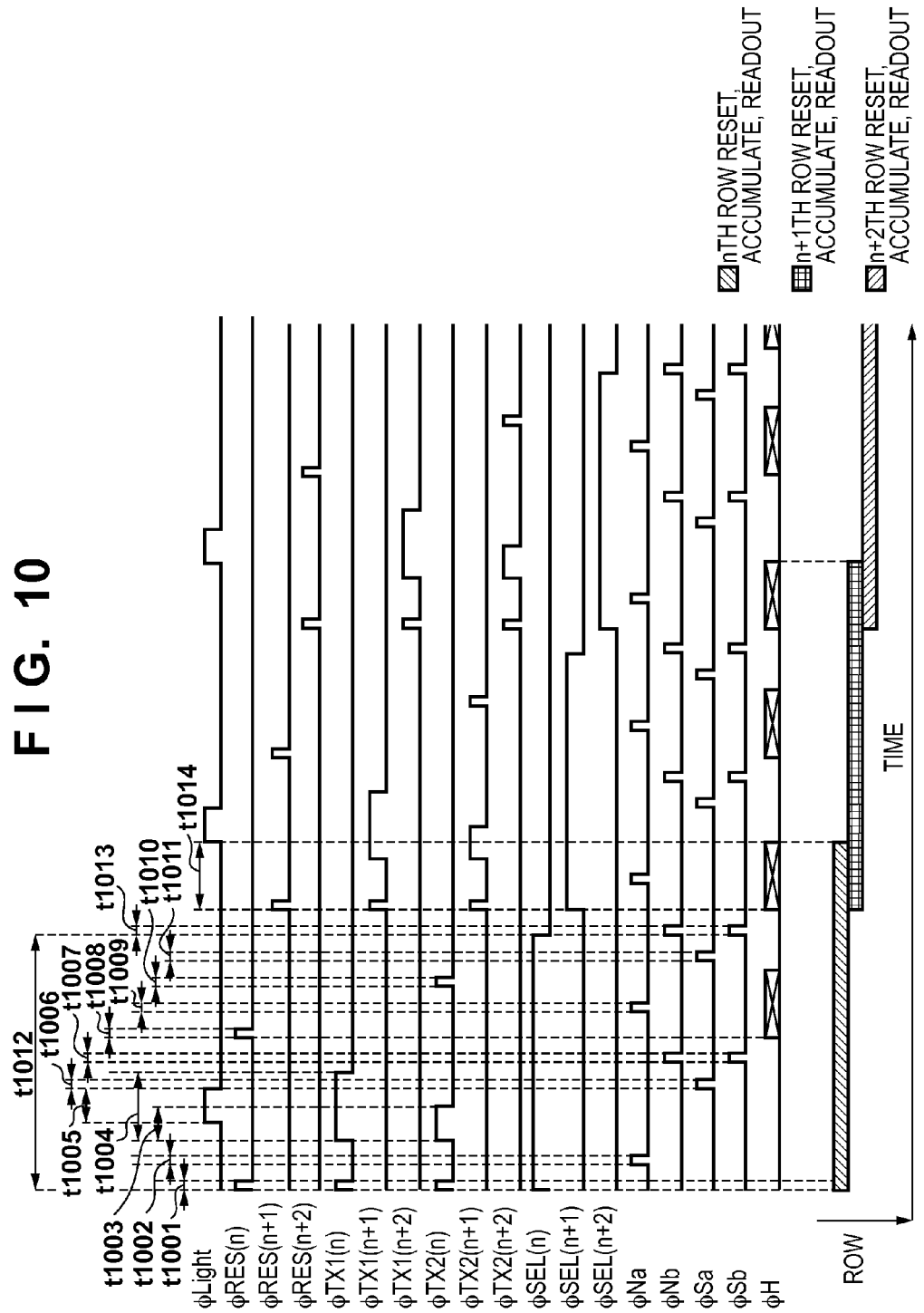
FIG. 10 is a timing chart illustrating a driving pattern for an image sensor when obtaining a range image according to the second embodiment.

Next, a driving pattern of the image sensor 102 when obtaining a range image according to the second embodiment will be described with reference to the timing chart illustrated in FIG. 10. n, n+1, and n+2 in parentheses after each pulse name indicate that the pulses are applied in the nth row, n+1th row, and n+2th row, respectively, in the same manner as in FIG. 9. Furthermore, no distinction is made between even-numbered rows and odd-numbered rows.

First, during period t1012, a readout row is selected by setting the vertical selection pulse φSEL (n) in the nth row to Hi and turning on the selection switch 309. In addition, the reset pulse φRES (n), the first transfer pulse φTX1 (n), and the second transfer pulse φTX2 (n) are set to Hi in period t1001. As a result, the reset switch 310, the first transfer switch 304, and the second transfer switch 306 in the nth row are turned on, and the potentials of the PD 303, the pixel memory 305, and the FD 307 are reset to an initial potential. Next, in period t1002, the reset potential in the FD 307 is read out to the first signal holding portion 804 by setting the first readout pulse φNa to Hi and turning the first readout switch 802 on.

Driving in periods t1003, t1004, and t1005 is the same as that in periods t603, t604, and t605 in FIG. 6.

Next, In period t1006, the portion of the signal potential in the FD 307 is read out to the first signal holding portion 805 by setting the first readout pulse φSa to Hi and turning the first readout switch 803 on. Then, in period t1007, the signals held in the first signal holding portions 804 and 805 are transferred to the second signal holding portions 808 and 809 by setting the second readout pulses φNb and φSb to Hi and turning the second signal readout switches 806 and 807 on. Thereafter, the horizontal transfer switches 810 and 811 are driven based on the horizontal selection pulse φH, and the signals in the nth row held in the second signal holding portions 808 and 809 are read out in sequence on a column-by-column basis.

Next, in period t1008, the reset pulse φRES (n) is set to Hi and the potential of the FD 307 is reset to the initial potential again. In period t1009, the reset potential in the FD 307 set in period t1008 is read out to the first signal holding portion 804 by setting the first readout pulse φNa to Hi and turning the first readout switch 802 on.

In period t1010, the charge in the pixel memory 305 is transferred to and held in the FD 307 by setting the second transfer pulse φTX2 (n) to Hi and turning the second transfer switch 306 on. In period t1011, the signal potential in the FD 307 is read out to the first signal holding portion 805 by setting the first readout pulse φSa to Hi.

In period t1013, the signals held in the first signal holding portions 804 and 805 are transferred to the second signal holding portions 808 and 809 by setting the second readout pulses φNb and Sb to Hi and turning the second signal readout switches 806 and 807 on. Thereafter, in period t1014, the horizontal transfer switches 810 and 811 are driven based on the horizontal selection pulse φH, and the signals in the nth row held in the second signal holding portions 808 and 809 are read out in sequence on a column-by-column basis.

Meanwhile, the readout of the signal in the n+1th row starts at the starting time of period t1014 in the same manner as in the nth row. The signals of the n+2th row are read out in the same manner when the readout of the n+1th row ends, and the same driving is carried out thereafter for all the rows.

Here, the driving method used when obtaining the range image is, as in the first embodiment, rolling driving in which reset/accumulation/readout are repeated sequentially on a row-by-row basis. Meanwhile, the processing method carried out by the signal processing circuit 107 is the same as the method described in the first embodiment.

As described thus far, according to the present second embodiment, disposing, in parallel, two circuit systems in which two signal holding portions are connected in series does increase the readout time, but also makes it possible to halve the number of horizontal transfer switches, from four to two, as compared to the column circuit described in the first embodiment. This makes it possible to reduce the space occupied in the horizontal direction and is therefore advantageous in terms of the layout.

Third Embodiment

Next, a third embodiment of the present invention will be described.

Configuration and Driving Method of Light-Emitting Device

When obtaining the range image, it is necessary that an optical intensity of the emitted light that is reflected by the subject and reaches the image sensor is maintained at a level that the image sensor can obtain a signal from the reflected light throughout the distance between the camera and subjects. The intensity of light has a property in which the light is dampened in inverse proportion to the square of the distance, and thus a high optical energy is desirable when emitting light.

Meanwhile, the driving method used when obtaining the range image in the present third embodiment is rolling driving in which reset/accumulation/readout are repeated sequentially on a row-by-row basis. In other words, it is sufficient for the light from the light-emitting device reflected by the subject to strike the pixel group of the selected row. Accordingly, it is not necessary to emit light across the entire angle of view, and the intensity of the emitted light can be increased by focusing the light to no less than the width that strikes the pixel group corresponding to the row. In the third embodiment, the intensity of the emitted light is increased by carrying out line scanning in accordance with the row.

Figure 11:
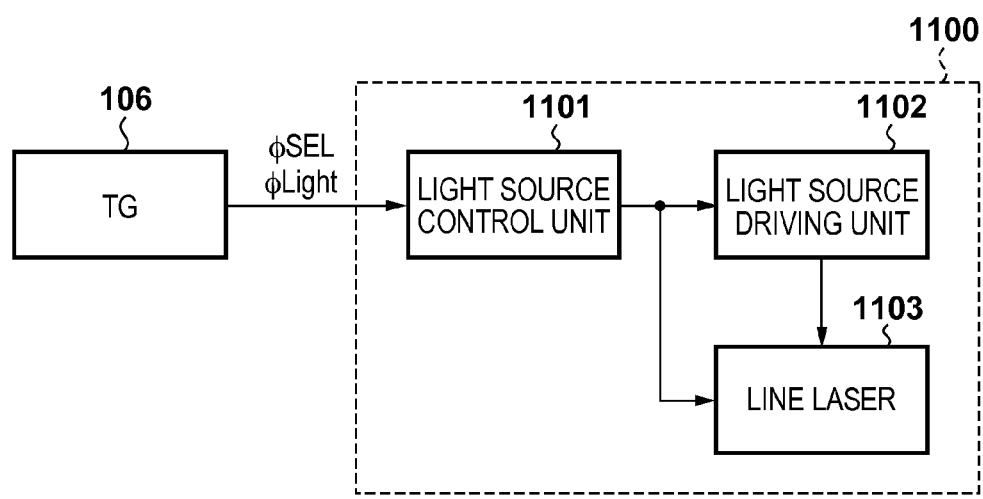
FIG. 11 is a block diagram illustrating the configuration of a light-emitting device according to a third embodiment.

FIG. 11 is a block diagram illustrating the configuration of the light-emitting device according to the third embodiment. A dotted line area 1100 indicates the light-emitting device, which is comprised of a light source control unit 1101, a light source driving unit 1102, and a line laser 1103. The light source control unit 1101 receives the vertical selection pulse φSEL and the light emission pulse φLight from the TG 106 illustrated in FIG. 1, and controls line scanning driving performed by the line laser 1103, controls the line laser 1103 on and off, and so on via the light source driving unit 1102.

Figure 12:
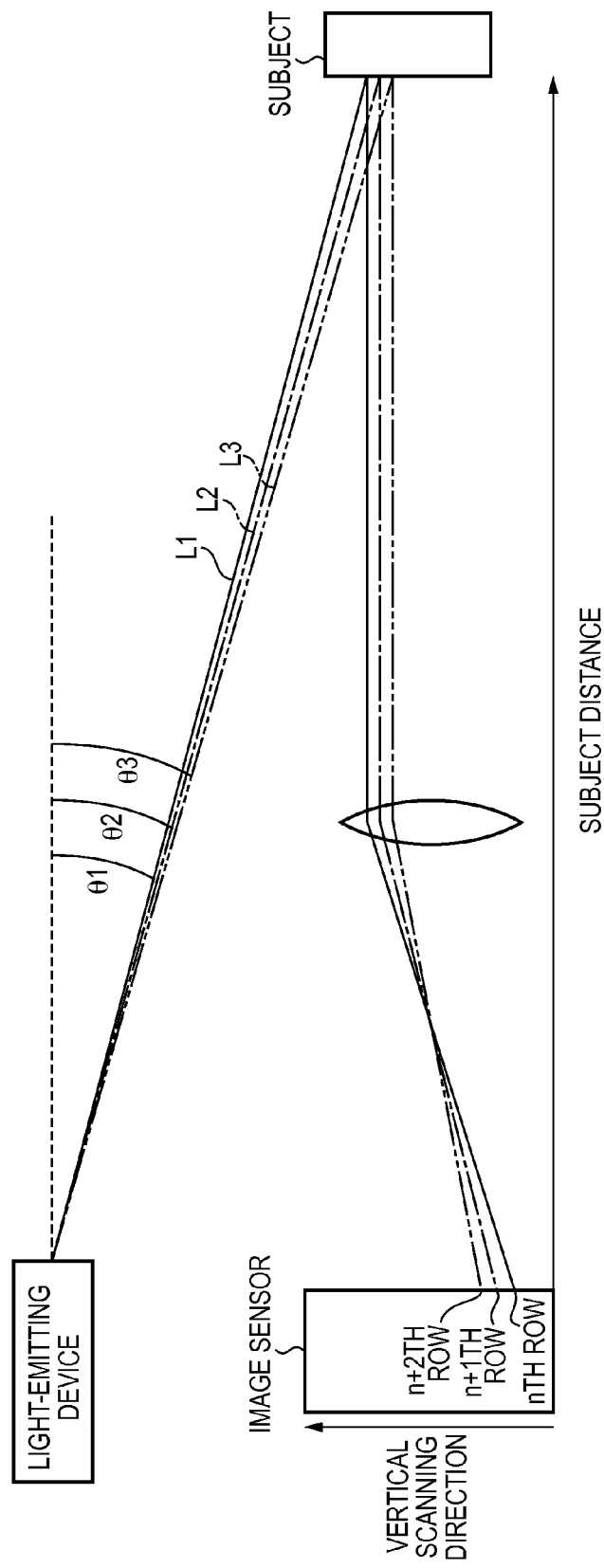
FIG. 12 is a schematic diagram illustrating a traveling path of light emitted from a light-emitting device according to the third embodiment.

FIG. 12 is a schematic diagram illustrating a position of light emitted by the light-emitting device and a traveling path of light. The position of light emitted is determined by changing an angle of the light emitted using the light source driving unit 1102 in the light-emitting device, and light emission angles θ1, θ2, and θ3 in FIG. 12 correspond to a solid line L1, a dot-dash line L2, and a double-dot-dash line L3, respectively, that indicate the traveling path of light.

Figure 13:
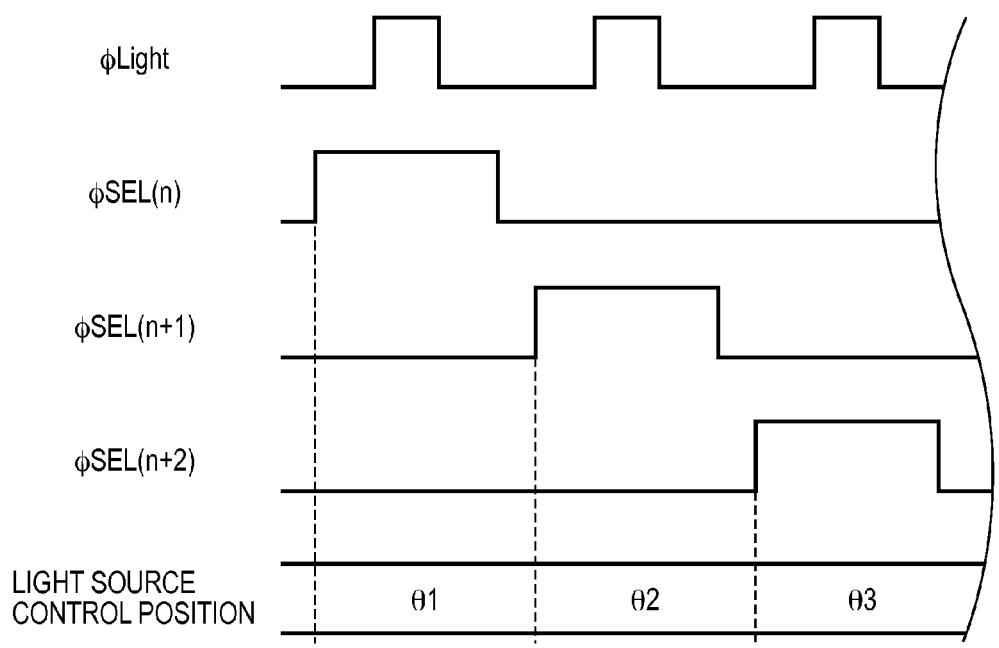
FIG. 13 is a timing chart illustrating driving of the light-emitting device according to the third embodiment.

FIG. 13 is a timing chart illustrating light emitted and light emission angle control. The line laser 1103 is turned on via the light source control unit 1101 during a period in which the light emission pulse φLight is Hi, and is turned off during a Low period. Meanwhile, the light source driving unit 1102 carries out angle control via the light source control unit 1101 to achieve an angle δ at which the light strikes the selected row in response to the selection pulse φSEL rising.

In this manner, using a light source that focuses light into a line, such as a line laser, to control the position of light emitted in accordance with a pixel row for which charge accumulation is being carried out makes it possible to increase the intensity of emitted light in an image sensor that carries out rolling driving.

At this time, various parameters regarding the emission of light, such as a light emission starting position, a light emission ending position, a light emission width, a light emission height, an interval across which the position of light emitted is changed, the speed at which the position of light emitted is changed, and so on may be varied using information on states, such as a driving mode of the image sensor 102, focal length information of the optical system 101, and so on.

Fourth Embodiment

Next, a fourth embodiment of the present invention will be described. In the aforementioned first embodiment, the pixel memory 305 and the FD 307 have the same impurity concentration in consideration of simplifying the process for forming the pixel portion 201. The same impurity concentration results in the same potential depth, and thus charge capacity division occurs when transferring the charge from the pixel memory 305 to the FD 307. In consideration of this, the distance information was described as being obtained on a pixel-by-pixel basis when obtaining the range image by calculating the charge Q1 and the charge Q2 in the signal processing circuit 107 based on the signals S1, S2, N1, and N2; however, this requires complex calculations, as indicated by Formulas (1) and (2). Furthermore, according to this configuration, the capacity division by the pixel memory 305 and the FD 307 also occurs when obtaining the normal image, resulting in a drop in sensitivity.

In light of this, the fourth embodiment employs a configuration in which the charge in the pixel memory 305 is completely transferred to the FD 307. Specifically, the impurity concentrations at which the pixel memory 305 and the FD 307 are respectively formed are varied so that the FD 307 has a deeper potential depth than the pixel memory 305. When such a configuration is employed, Formulas (1) and (2) described in the first embodiment become unnecessary, and the charge ratio R can be found through the following Formula (8), using signals N1, N2, S1, and S2.

$$R=(S2-N2)/((S1-N2)+(S2-N2)) \quad (8)$$

As indicated above, the calculations required when obtaining the distance information can be simplified. Furthermore, a drop in sensitivity caused by capacity division can be reduced when obtaining the normal image as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-078977, filed on Apr. 7, 2014 which is hereby incorporated by reference herein in its entirety.

What is claimed is:

1. An image capturing apparatus comprising:
a light emitting source that emits light toward a subject;
an image sensor in which a plurality of pixels are disposed in a matrix, each pixel including a photoelectric conversion element that generates a charge in accordance with an amount of incident light, a first charge accumulation portion, a second charge accumulation portion, a first switch that connects the photoelectric conversion element and the first charge accumulation portion, and a second switch that connects the first charge accumulation portion and the second charge accumulation portion;
a driver that drives the image sensor to turn on the first and second switches substantially simultaneously after a predetermined period has passed from the start of a charge accumulation period in the photoelectric conversion element before turning on the light source, then turn off the second switch before turning off the light source and turn off the first switch after turning off the light source; and
a calculator that calculates a distance to the subject based on a first signal corresponding to the charge accumulated in the second charge accumulation portion and a second signal corresponding to a charge accumulated in the first charge accumulation portion.

2. The image capturing apparatus according to claim 1, wherein the second switch is turn off at a time at which half a light emission period of the light source has passed.

3. The image capturing apparatus according to claim 1, further comprising:
a reset portion that resets the first charge accumulation portion and the second charge accumulation portion; and
four signal holding portions connected in parallel to each of columns of the plurality of pixels,
wherein of the first signal, the second signal, a reset signal read out from the image sensor before the first signal is read out, and a reset signal read out from the image sensor before the second signal is read out, each of the four signal holding portions holds a different signal from the other signal holding portions.

4. The image capturing apparatus according to claim 3, wherein
two of the signal holding portions are connected in series.

5. The image capturing apparatus according to claim 1, wherein the light source emits light concentrated in line form, and emits the light while varying an angle at which the light is emitted so that reflected light from the subject is incident on the photoelectric conversion elements in each row of the image sensor in order.

6. The image capturing apparatus according to claim 5, wherein the photoelectric conversion element generates a charge in accordance with an amount of light incident via an optical system; and
the light source can be controlled at least one of parameters for a light emission starting position, a light emission ending position, a light emission width, a light emission height, an interval across which a position of light emitted is changed, and a speed at which the position of light emitted is changed, in accordance with driving of the image sensor and a state of the optical system.

7. The image capturing apparatus according to claim 1, wherein the first charge accumulation portion and the second charge accumulation portion have mutually different impurity concentrations so that a potential of the second charge accumulation portion is higher than a potential of the first charge accumulation portion.

8. A control method for an image capturing apparatus including a light source that emits light toward a subject and an image sensor in which a plurality of pixels are disposed in a matrix, each pixel including a photoelectric conversion element that generates a charge in accordance with an amount of incident light, a first charge accumulation portion, a second charge accumulation portion, a first switch that connects the photoelectric conversion element and the first charge accumulation portion, and a second switch that connects the first charge accumulation portion and the second charge accumulation portion, the method comprising:
turning on the first and second switches substantially simultaneously after a predetermined period has passed from the start of a charge accumulation period in the photoelectric conversion element before turning on the light source;
turning off the second switch before turning off the light source;
turning off the first switch after turning off the light source; and
calculating a distance to the subject based on a first signal corresponding to the charge accumulated in the second charge accumulation portion and a second signal corresponding to a charge accumulated in the first charge accumulation portion.

* * * * *